Dec. 6, 1927.  
W. R. HARDEN  
BAND SAWING MACHINE  
Filed Oct. 15, 1923  
1,651,702  
3 Sheets-Sheet 1
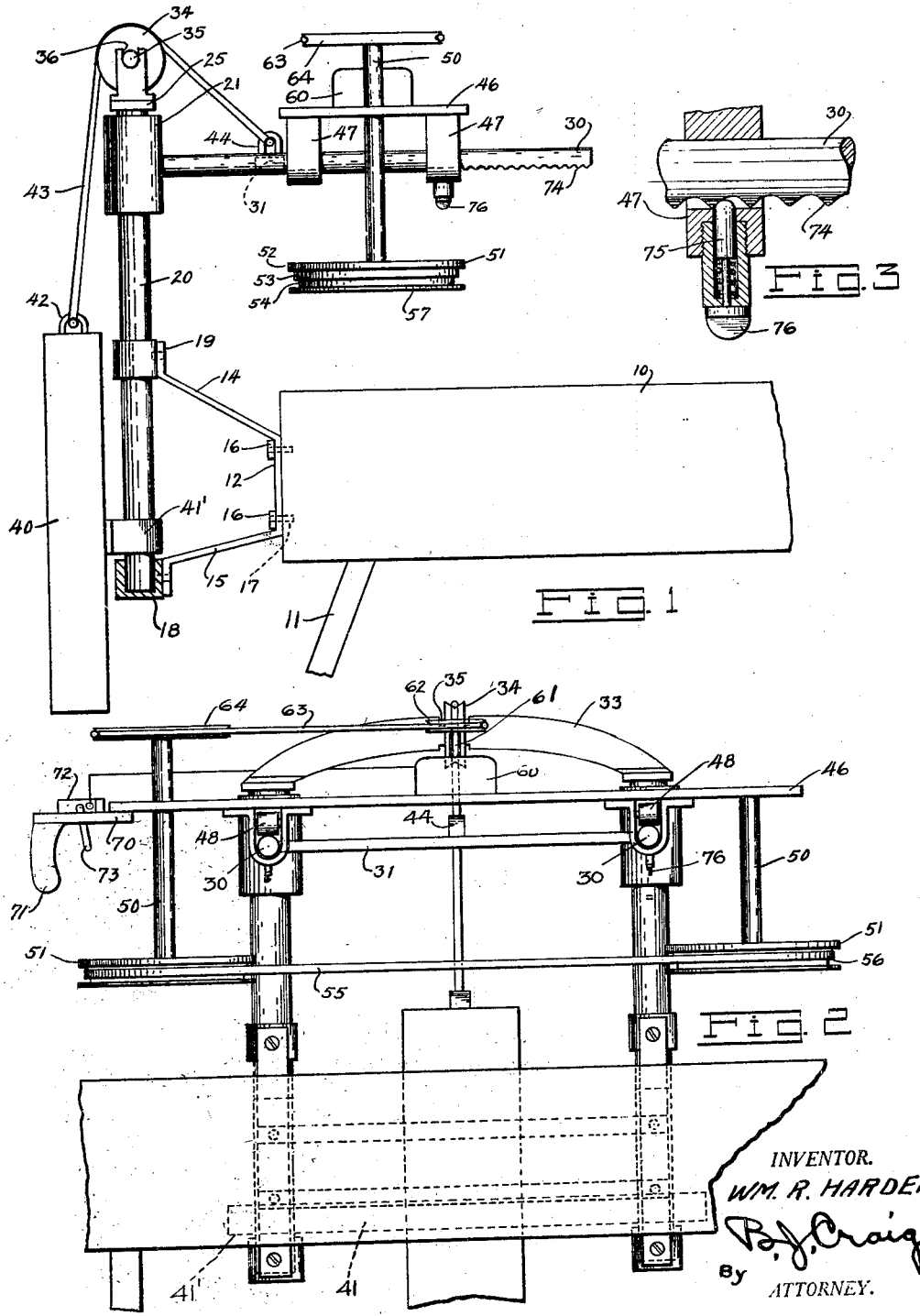
INVENTOR.  
WM. R. HARDEN  
By B. J. Craig  
ATTORNEY.

Dec. 6, 1927.  
W. R. HARDEN  
BAND SAWING MACHINE  
Filed Oct. 15, 1923
1,651,702
3 Sheets-Sheet 2
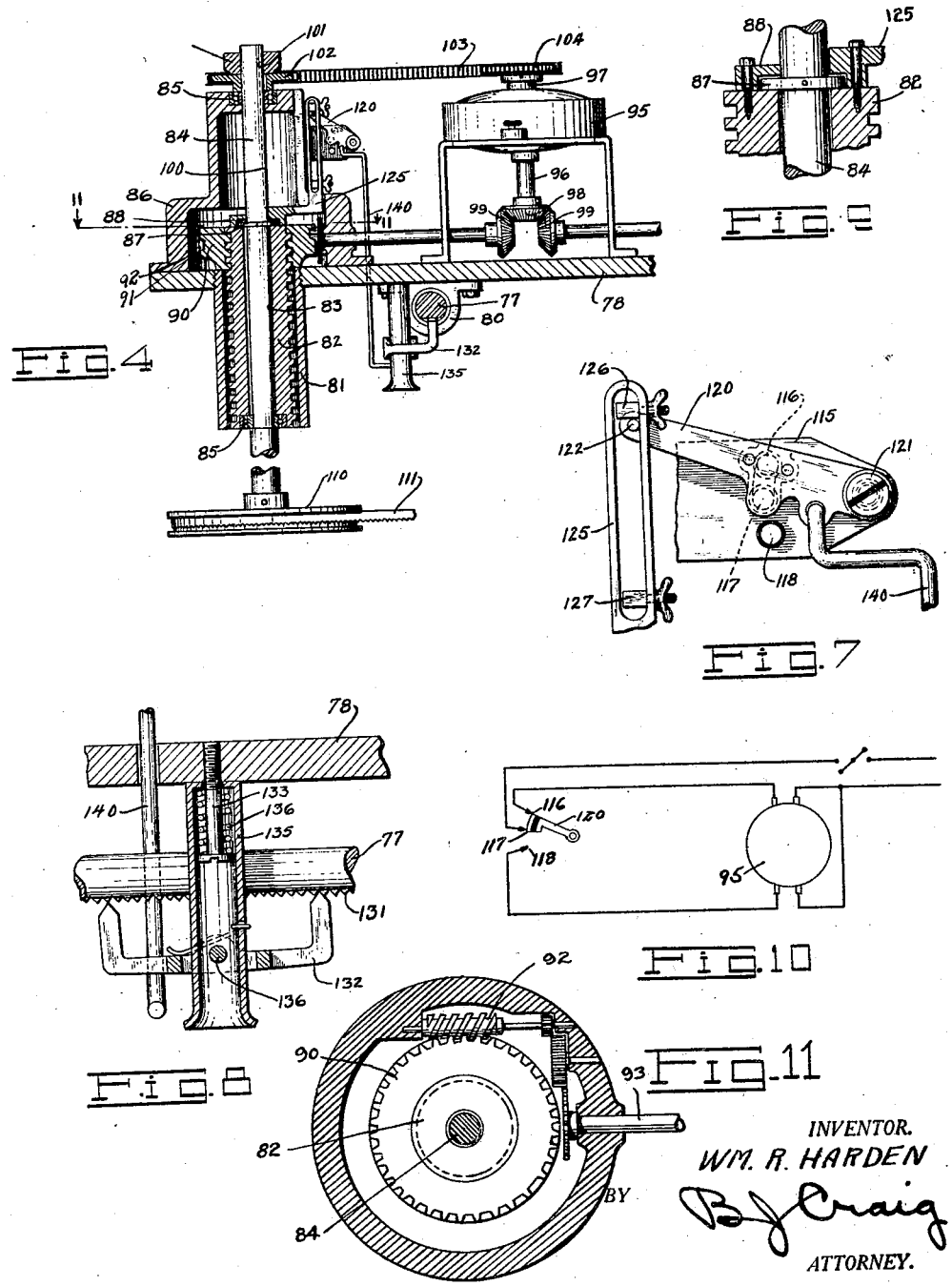
INVENTOR.
WM. R. HARDEN
BY B. J. Craig
ATTORNEY.

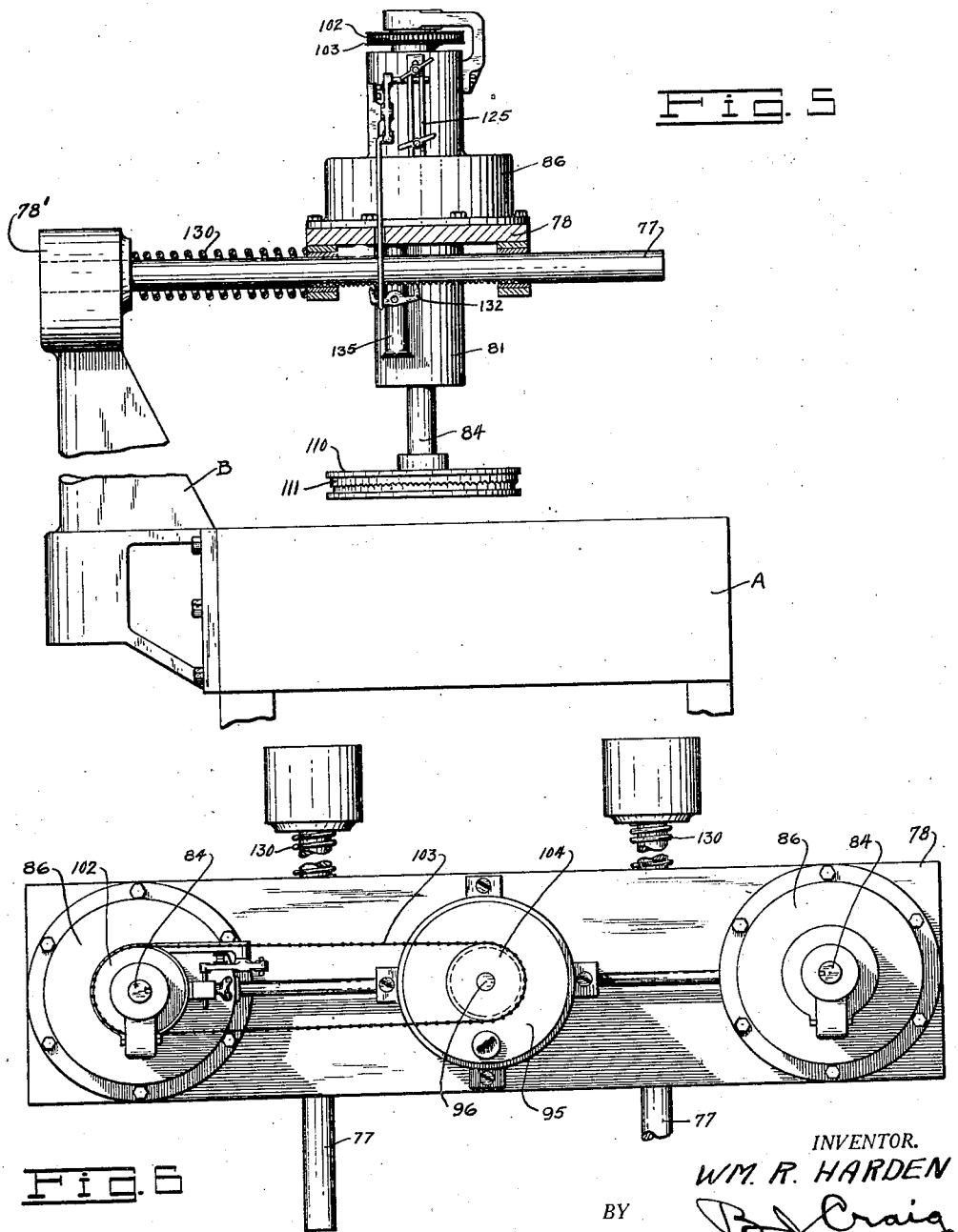

Patented Dec. 6, 1927.

1,651,702

UNITED STATES PATENT OFFICE.

WILLIAM R. HARDEN, OF OAKLAND, CALIFORNIA.

BAND-SAWING MACHINE.

Application filed October 15, 1923. Serial No. 668,566.

This invention relates to band sawing machines.

The general object of the invention is to provide an improved type of band sawing machine wherein both a vertical and lateral adjustment of the saw may be effected with a minimum of effort.

One of the specific objects of the invention is to provide a band sawing machine so constructed that the band saw and its operating parts may be moved laterally toward and from the object and wherein the mechanism may be adjusted vertically to accommodate articles of different heights.

Another object of the invention is to provide a band sawing machine wherein the saw is mounted to move on tracks toward and from the work.

Another object of the invention is to provide a band sawing machine, wherein the saw and its driving parts are mounted as a unit upon a track so that they may be shifted laterally, and wherein the track itself is mounted for vertical adjustment.

A further object of the invention is to provide a band sawing machine wherein the pulleys supporting the saw rotate about vertical axes, and wherein the saw is adjustable horizontally and laterally.

A further object of the invention is to provide a band sawing machine having an automatic control whereby the saw may be caused to move toward and from the work and whereby lateral adjustment of the saw toward the work may be effected.

An additional object of the invention is to provide a band saw which may be moved laterally toward the work, thus allowing the work to remain stationary while the saw moves toward it to perform the sawing action.

A further object of the invention is to provide a band sawing machine, having a saw movable toward and from the work together with means for adjusting the saw so that a step by step advance of the sawing blade may be effected, to enable cuts of uniform thickness to be made.

Further objects of the invention will be apparent from the following description taken in connection with the accompanying drawings wherein Fig. 1 is a side elevation of a band sawing machine embodying the features of my invention; Fig. 2 is a front elevation of the band sawing machine; Fig. 3 is a detail of the locking means; Fig. 4 is a cross section partly in elevation of a modification of my invention; Fig. 5 is an end view of a modification; Fig. 6 is a top plan view of the modification; Fig. 7 is an elevation showing details of the reversing mechanism; Fig. 8 is a sectional detail partly in elevation showing the ratchet mechanism; Fig. 9 is a sectional detail of the holding member; Fig. 10 is a wiring diagram, and Fig. 11 is a section on line 11—11, Fig. 4.

Referring to the drawing by reference characters, I have shown a cutting block 10 having supporting legs 11 thereon. Although in the following description, I describe my invention in connection with a meat cutting machine I wish it to be understood that this is merely typical of one of the many uses to which my invention may be put and I do not wish to be limited to this use only.

The means for supporting my improved machine is shown at 12. This means comprises a bracket having upwardly and downwardly extending arms 14 and 15. A pair of these brackets are used which are spaced apart and, as shown, are connected by transverse bars 16. Suitable fastening means 17 may serve to hold the bracket upon the cutting block.

Adjacent the lower end of each arm 15, I show a cup 18 and upon each arm 14 I show a collar 19. A pair of tubular uprights 20 or standards are shown, each having one end arranged within the cups 18 and passing through the collars 19. The standard 20 may be pemanently secured within the cup 18 if desired, but I prefer that it be easily removed, to facilitate moving the machine from one working bench to another.

Each of the standards 20 is provided with a movable collar or support 21 thereon. These collars or supports have a sliding engagement with the uprights 20 and preferably are provided with anti-friction members to allow them to move readily. The upward movement of the collar 21 may be limited by a stop 25 while the downward movement may be limited by the collar 19 on the bracket 14.

Each of the members 21 is shown as provided with a horizontally extending trackway 30. As shown, each track comprises a pair of cylindrical members horizontally arranged and in spaced parallel relation. The tracks 30 are shown as connected by a rod 31 while the upper extremities of the standards 20 are connected by an arcuate member 33 which has a pulley 34 mounted on a shaft 35 shown as fitted in a recess 36 in the arcuate member.

A counterweight is shown at 40. This counterweight is provided with a band 41 the ends 41' of which loosely encircles the standards 20. The counterweight 41 is provided at its upper end with a loop 42 to which one end of a cable 43 may be secured. The cable passes over the pulley 34 and the other end engages a staple 44 shown as mounted on the rod 31 which connects the tracks 30. The band 41 is so proportioned that as the counterweight rises and the support 21 moves down, the two will not interfere in passing.

Mounted upon the track 30, I show a platform 46. This platform is provided, at each end, with a pair of stirrups 47 having rollers 48 associated therewith to enable the platform to move upon the track. Adjacent each end of the platform 46 I show a shaft 50 and mounted upon the lower end of the shaft I show pulleys 51. Each of these pulleys 51 preferably comprises a member having three steps 52, 53, and 54. The step 53 is the one which is engaged by the saw, which is preferably of the usual band saw type. The saw is shown at 55 and it will be noted that the teeth 56 thereof project over the step 54. A retaining disc 57 may be provided on each drum 51 to act as a safety member in case the saw slips from a pulley.

In order to drive the band saw, I show a motor 60 mounted on the platform 46. The motor is provided with a shaft 61 having a pulley 62 thereon. A belt 63 passes over the pulley 62 and engages a pulley 64 shown as mounted upon one of the shafts 50.

The counterweight 40 is of such weight as to just balance the weight of the tracks 30 and the mechanism on them so that the saw may be very easily moved vertically toward and from the work. In order to move the saw I show the platform 46 provided with an extension 70 on which I arrange a handle member 71. Adjacent the handled member 71 I show a switch 72 for controlling the operation of the motor 60. The switch 72 is provided with an operating member 73 which is arranged adjacent the handle 71.

In order to hold the saw in various adjustments I show the bar 30 as provided with a plurality of notches 74 while upon one of the stirrups 47 adjacent the handle 71 I show a spring pressed locking dog 75 which is adapted to engage the teeth 74 upon the track 30. The locking dog 75 is provided with an operating portion 76 which allows easy adjustment of the saw.

In operating my device material to be sawed is placed upon the table 10 and the saw moved along the track until it is in the desired position. The operating handle 71 is then grasped and the platform is then lowered toward the article at the same time the operating handle 73 is moved to start the motor and cause the saw to function.

Referring to the modification of my invention shown in Figs. 4 to 10 I show at A, a supporting block having spaced brackets B secured thereto. Secured upon the bracket B, I show a pair of track members 77 which are affixed in a boss 78' upon the bracket. Mounted upon the track 77 I show a platform 78 which is provided with pairs of guide members 80 secured to the track so that the platform can be moved back and forth upon the track. At each end of the platform I provide a cylindrical bushing or guide 81 through which a screw 82 extends. The screw is mounted for vertical movement in the tube 81 and through the center of the screw I show a passage 83. Extending through the passage 83 I show a shaft 84. The shaft is provided with suitable bearing members 85. The lower bearing 85 is mounted in the lower end of the screw 82 while the upper bearing 85 is mounted in a closure cap 86 shown as removably secured to the platform 78.

A collar 87 is provided upon the shaft 84 and a cap member 88 serves to secure the collar against movement relative to the screw 82. Within the cap 86 I show a nut 90 which engages the screw 82. In order to provide means for rotating the nut 90 its outer surface is cut to form a worm wheel 91 which is adapted to engage a worm 92 driven from the shaft 93. Arranged upon the platform 78 I show a motor 95 having a drive shaft extending from both sides thereof as at 96 and 97. The drive shaft 96 is provided with a gear 98 which engages a gear 99 on the shaft 93.

From the foregoing description it will be apparent that when the motor is operated the shaft 96 will drive the shaft 93 which in turn will rotate the nut 90 and thus cause the screw 82 to raise or lower with the shaft 94. In order to drive the shaft 84 while it is being raised or lowered or while it is stationary I show the shaft provided with a keyway 100 which engages a key 101 mounted on a sprocket 102 which is adapted to be driven by the chain 103 passing over the gear 104 mounted on the shaft 97. From this description it will be obvious that when the motor 95 turns the shaft 97 the chain 103 will drive the sprocket 102 and consequently rotate the shaft 84. It will accordingly be obvious that the shaft 84 will be rotated by the motor 95 and at the same time this shaft will move up and down depending on the direction of the rotation of the motor.

Upon the lower end of each shaft 84 I show a pulley 110 fixed thereon and over each of these pulleys a band saw 111 operates. It is desirable that this band saw be made to rotate and at the same time to move up and down automatically.

To bring about this result the motor 95 is reversable by means of a switch member 115. The switch member 115 has three contact points 116, 117, 118. A switch closer is shown at 20. This closer is pivoted at 121 to the switch member 115 and the construction is such that when the switch is in the position shown in Fig. 7 with the contact member 120 bridging the contacts 116 and 117 the motor will operate in one direction while when the contact 120 is arranged to bridge the contact points 117, 118 the direction of the motor will be reversed.

In order to provide automatic means for reversing the motor, I show the contact 120 provided with an operating member 122 and the cap 88 as provided with a slotted member 125. The slotted member is provided with a pair of adjustable stops 126 and 127 which are movable along the slotted member. The operating member 122 moves in the slotted member and when the screw 82 has moved down carrying the arm 125 with it, to a position so that the stop 126 engages the arm 120, the latter moves down until the contacts 117 and 118 are bridged and the motor is reversed. As the screw 82 moves upwardly the stop 127 engages the operating member 122 again rocking the arm 120 and bridging the contacts 116, 117 to again reverse the motor.

During all of this operation the pulley 110 is being rotated, thus driving the band saw. The cutting surface of the teeth of the band saw are arranged so that as the saw comes down these teeth perform their cutting operation.

The platform 78 is adapted to be moved outwardly by means of compression springs 130. In order to provide a step by step movement for this platform I show the rods 77 as provided with teeth 131 while upon the platform I mount a pawl member 132. The pawl member is arranged on a pin 133 secured to the platform 78. The ratchet includes a tube 135 which is mounted for vertical movement on the pin 133 being held in the position shown in Fig. 8 by a spring 136. When the pawl 132 is rocked about its pivot 136 the platform 78 moves out a distance depending on the size of the teeth in the rod 77.

In order to provide means to rock the pawl 132 I show an operating member 140 engaging the pawl 132 at one end and at the other end engaging the switch member 120. From the foregoing description it will be apparent that when the saw 111 moves vertically away from the cutting table that the arm 140 will rock the pawl 132 and cause the platform to move forward toward the work a distance equal to the thickness of one of the teeth 131.

I claim—

1. In a band sawing machine, a support, a horizontal trackway arranged on said support and projecting therefrom, said trackway being mounted for vertical movement, a platform movably mounted on said trackway to move toward and from said support, spaced shafts mounted on said platform, pulleys on said shafts, a band saw supported by said pulleys, said pulleys being mounted to rotate about vertical axes, and means to operate said band saw.

2. In a band sawing machine, a supporting member including a horizontal trackway projecting therefrom and movable vertically with the trackway remaining horizontal, a platform movably mounted on said trackway to move toward and from said member, a pair of pulleys on said platform, a band saw supported on said pulleys and means to operate said band saw.

3. In a meat sawing machine, the combination of a cutting block, a supporting member thereon comprising a pair of spaced brackets, a horizontal track member supported by each of said brackets, said track members being movable vertically without changing their horizontal position, a platform mounted on rollers on said track, a pair of shafts mounted on said platform pulleys carried by said shafts, a saw engaging said pulleys, a motor mounted on said platform and adapted to drive one of said shafts and means for adjusting the position of said platform on said track.

4. In a band sawing machine, a supporting member, said supporting member comprising a pair of arms having a cup at the lower end thereof and having a collar at the top thereof, a pair of cylindrical rods having their ends fitted in said cups and extending through said collar, a sliding member mounted to slide vertically on each of said rods, a horizontal track supported by each of said sliding members, a platform mounted on rollers on said track, a pair of shafts mounted on said platform, pulleys mounted on said shafts, a band saw engaging said pulleys and means for driving said band saw.

5. In a meat sawing machine, the combination of a cutting block, a supporting member thereon, said supporting member comprising a pair of arms having a cup at the lower end thereof and having a collar at the top thereof, a pair of cylindrical rods each having one end fitted in one of said cups and extending through said collar, a sliding member mounted to slide vertically on each of said rods, a horizontal track supported by each of said sliding members, a brace connecting said tracks, a pulley mounted on said rods, a counterweight, a cable connecting said counterweight and said brace and passing over said pulley, said counterweight engaging the lower portion of said rods and being guided thereby, a platform mounted on rollers on said track, a pair of shafts mounted on said platform, pulleys mounted on said shafts, a band saw engaging said pulleys, a motor mounted on said platform and adapted to drive one of said shafts and means for adjusting the position of said platform on said track.

In testimony whereof, I hereunto affix my signature.

WILLIAM R. HARDEN.